W. Y. HENRY.
SEEDING MACHINE.
No. 21,959. Patented Nov. 2, 1858.
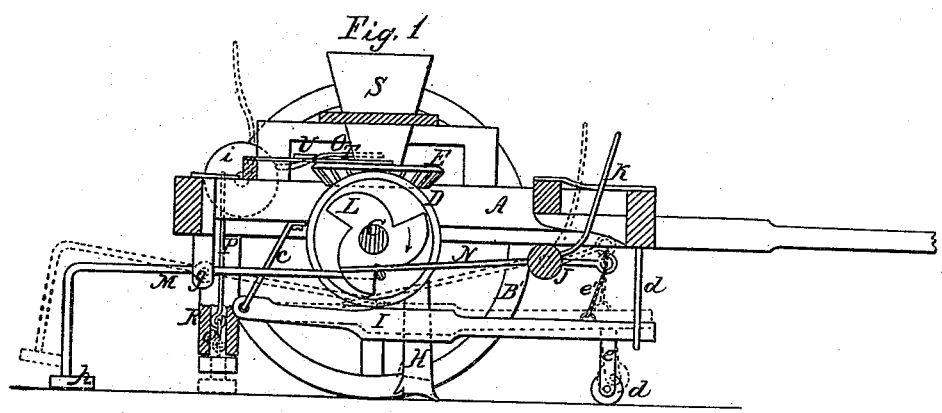
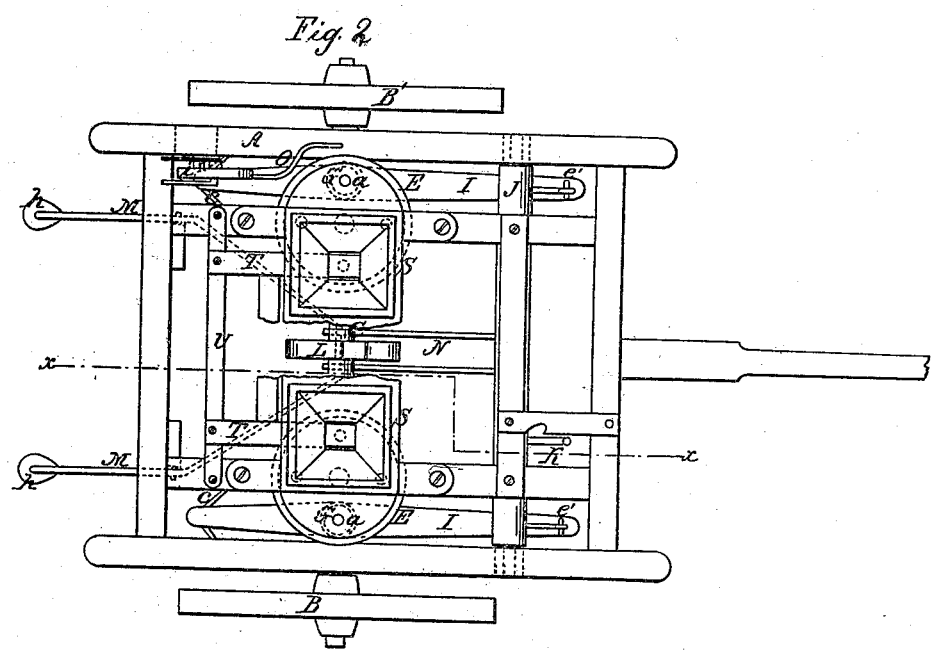

UNITED STATES PATENT OFFICE.

W. Y. HENRY, OF MONMOUTH, ILLINOIS.

IMPROVEMENT IN SEEDING-MACHINES.

Specification forming part of Letters Patent No. 21,959, dated November 2, 1858.

*To all whom it may concern:*

Be it known that I, W. Y. HENRY, of Monmouth, in the county of Warren and State of Illinois, have invented a new and useful Improvement in Seeding-Machines; and I do hereby declare that the following is a full, clear, and exact description of the same, reference being had to the annexed drawings, making a part of this specification, in which—

Figure 1 is a side sectional elevation of my improvement, taken in the line $xx$, Fig. 2. Fig. 2 is a plan or top view of the same.

Similar letters of reference indicate corresponding parts in the two figures.

This invention relates to an improvement in that class of seeding-machines which are designed for planting seed in check-rows; and the invention consists in a peculiar arrangement of means, hereinafter fully shown and described, whereby the seed-distributing device, markers, and shares are placed under the complete control of the driver and the operation of planting seed in check-rows greatly facilitated.

To enable those skilled in the art to fully understand and construct my invention, I will proceed to describe it.

A represents a rectangular frame, which is mounted on two wheels, B B', the axle C of which is fitted in suitable bearings at the under side of the frame A. The wheel B is permanently attached to the axle C, which turns in its bearings; but the other wheel, B', is placed loosely on the axle.

On the axle C two bevel-wheels, D, are placed, and secured to it so as to turn with the axle. These wheels gear into corresponding wheels, E E, which are fitted on circular disks or plates attached to the frame A, the wheels E E being allowed to turn freely on said plates. The wheels E have each three holes, $a$, made through them at equal distances apart, and a hole is made through the plates on which the wheels E are placed.

To the frame A two tubes, G G, are attached, one at each side, and in line with the holes in the plates.

H H are conveying-tubes, into which the tubes G are fitted loosely. The tubes H are attached to or fitted in levers or bars I I, one to each. These levers I I have their back ends supported from the frame A by straps $c$, the levers or bars being allowed to work freely on the straps. The front ends of the levers or bars I I are fitted or work in pendent guides $d$, and have rollers attached to them, said rollers being fitted in upright bars $e$, which pass through the levers or bars and are secured at any desired point by set-screws. The front ends of the levers or bars I are connected by chains $e'\ e'$ with a drum, J, which is fitted to the front part of the frame A. To this drum a lever, K, is attached.

On the center of the axle C a cam, L, is placed, said cam acting upon the ends of two levers or rods, M M, which have their fulcra at $g$. The outer ends of the rods M are bent downward at right angles to the other, and have pestles or weights $h$ attached to them, one to each.

To the drum J a lever, N, is attached, said lever extending back and resting upon the inner ends of the levers or rods M M.

On the back part of the frame A, and at the side adjoining the wheel B, a small wheel, $i$, is placed. To this wheel $i$ a lever, O, is attached, and a rod, P, is also attached to said wheel near its periphery, the rod P being connected at its lower end to a slide, Q, which is fitted in a guide-box, R, attached to the frame A.

S S are two hoppers which are placed over the inner parts of the wheels E E, and T T are two slides which work under the hoppers S S and serve as cut-offs, said slides being attached to a cross-bar, U, having a lever connected to it.

The operation is as follows: As the machine is drawn along the wheels E E are rotated by the wheels D on the axle C, and the seed is conveyed by the holes $a$ in said wheels around to the tubes G and dropped into the conveying-tubes H, which conduct the seed into the furrows made by the lower ends of the tubes H, which are of share shape, the tubes H being allowed to conform to the inequalities of the ground in consequence of their attachment to the bars or levers I I. The seed, in consequence of the holes $a$ being some distance apart, drop the seed in hills; and as each hole A discharges its seed the cam L actuates the rods M, so that the pestles or weights $h$ will descend or drop simultaneously with the dropping of seed and press the earth on the two hills previously dropped, thereby marking the spot. Each hill of seed being thus marked, the driver can always not only commence rows even with the rows last planted, but also keep the rows parallel with each other, for the driver has complete control over the seed-distributing device, as the slides T may be shoved inward at any time. In turning at the ends of rows, or in moving the machine from place to place, or at other times where the seed-distributing device is not to be used, the driver draws back the lever K, and thereby raises the levers I I and tubes H, and also the markers p p, as the lever N bears on the inner ends of the rods M M. In commencing rows the machine is moved in line with those of the rows previously planted, the lever K shoved forward, and the wheel i turned by grasping its lever O, so that the rod P will bear or press on the slide Q, so that the end of the frame A will rise and the wheel B' be elevated free from the ground. By this means the wheel B' may be turned until the holes a in the wheels E will be brought in line with the tubes G H, which will be signified by the dropping of the weights h h. The machine may then be moved along for the planting of the rows.

I do not claim the markers or weights h h, for they have been previously used; but,

Having thus described my invention, what I claim as new, and desire to secure by Letters Patent, is—

Connecting or arranging the levers or rods M M of the pestles or weights h and the levers I of the tubes H, substantially as shown, when used in combination with the wheel i, connected with the slide Q, and the whole arranged to operate as and for the purpose set forth.

W. Y. HENRY.

Witnesses:
GEO. BABCOCK,
JAS. B. SHAW.